United States Patent
Spitz et al.

(10) Patent No.: US 7,721,157 B2
(45) Date of Patent: May 18, 2010

(54) MULTI-NODE COMPUTER SYSTEM COMPONENT PROACTIVE MONITORING AND PROACTIVE REPAIR

(75) Inventors: Mark Lewis Spitz, San Jose, CA (US); Adrian Sfarti, Cupertino, CA (US)

(73) Assignee: Omneon Video Networks, Sunnyvale, CA (US)

( * ) Notice: Subject to any disclaimer, the term of this patent is extended or adjusted under 35 U.S.C. 154(b) by 388 days.

(21) Appl. No.: 11/371,507

(22) Filed: Mar. 8, 2006

(65) Prior Publication Data
US 2007/0214255 A1 Sep. 13, 2007

(51) Int. Cl.
*G06F 11/00* (2006.01)
(52) U.S. Cl. .................................................... 714/47
(58) Field of Classification Search .................. 714/47, 714/48, 54, 56, 57, 42, 39, 31
See application file for complete search history.

(56) References Cited

U.S. PATENT DOCUMENTS

| | | | |
|---|---|---|---|
| 4,707,796 A | | 11/1987 | Calabro et al. |
| 5,500,940 A | * | 3/1996 | Skeie ........................... 714/25 |
| 5,828,583 A | | 10/1998 | Bush et al. |
| 6,044,476 A | * | 3/2000 | Ote et al. ....................... 714/31 |
| 6,167,358 A | * | 12/2000 | Othmer et al. ............... 702/188 |
| 6,625,750 B1 | * | 9/2003 | Duso et al. ..................... 714/11 |
| 6,718,482 B2 | * | 4/2004 | Sato et al. ....................... 714/4 |
| 6,751,753 B2 | * | 6/2004 | Nguyen et al. ................. 714/39 |
| 6,968,291 B1 | * | 11/2005 | Desai ........................ 702/182 |
| 6,977,908 B2 | | 12/2005 | de Azevedo et al. |
| 6,978,398 B2 | | 12/2005 | Harper et al. |
| 6,988,224 B2 | * | 1/2006 | Robison et al. ................ 714/47 |
| 7,254,749 B2 | * | 8/2007 | Abrahams et al. ............. 714/47 |
| 7,340,361 B2 | * | 3/2008 | Aguilar et al. ................ 702/90 |
| 2003/0187859 A1 | | 10/2003 | Belov |
| 2003/0187860 A1 | | 10/2003 | Holland |
| 2003/0187866 A1 | | 10/2003 | Zelenka |
| 2003/0187883 A1 | | 10/2003 | Zelenka et al. |
| 2004/0078633 A1 | | 4/2004 | Holland |
| 2004/0153479 A1 | | 8/2004 | Mikesell et al. |
| 2005/0015624 A1 | * | 1/2005 | Ginter et al. ................. 713/201 |
| 2005/0060618 A1 | | 3/2005 | Guha |

(Continued)

OTHER PUBLICATIONS

C. Akinlar, et al., "A Scalable Bandwidth Guaranteed Distributed Continuous Media File System Using Network Attached Autonomous Disks", IEEE Transactions on Multimedia, vol. 5, No. 1, Mar. 2003, ISSN: 1520-9210 (pp. 71-96).

(Continued)

*Primary Examiner*—Nadeem Iqbal
(74) *Attorney, Agent, or Firm*—Hickman Palermo Truong & Becker LLP (57) ABSTRACT

A highly available multi-node computer system is operated by monitoring the aging and usage of a plurality of hardware components that are part of the system's networked nodes. While monitoring the components, a determination is made that one of the components has aged, worn, or both, to a level that is selected as being close enough to the component's predicted end of life in the system so as to prevent failure of the component in the system. A notification is sent to replace the component, in response to the determination. Other embodiments are also described and claimed.

20 Claims, 5 Drawing Sheets

U.S. PATENT DOCUMENTS

2006/0020866 A1* 1/2006 Lo et al. .................... 714/741
2007/0198679 A1* 8/2007 Duyanovich et al. ........ 709/223

OTHER PUBLICATIONS

Srinivas Eeda, "Oracle Cluster File System Physical Design & Implementation", Oracle® Corporation, California, USA, Dec. 2003 (65 pages).

Preslan, et al., "A 64-Bit, Shared Disk File System for Linux", Sixteenth IEEE Mass Storage Systems Symposium, Mar. 15-18, 1999 (pp. 22-41).

Anderson, et al., "xFS Project Architecture", Silicon Graphics, Oct. 8, 1993 (pp. 1-15).

Shepard, et al., "SGI® InfiniteStorage Shared Filesystem CXFS™: A High Performance, Multi-OS Filesystem from SGI", White Paper, Jun. 16, 2004 (19 pages).

"Implementing Total Data Life Management With StorNext® Management Suite", Advanced Digital Information Center, Washington, USA, ADIC White Paper 2004 (22 pages).

Ghemawat, et al., "The Google File System", 19th ACM Symposium on Operating Systems Principles, New York, USA, Oct. 2003 (15 pages).

"Notification Concerning Transmittal of International Preliminary Report on Patentability" received in International application No. PCT/US2007/005948 dated Apr. 2, 2009, 8 pages.

Current claims of application No. PCT/US2007/005948 (May 2009) 4 pages.

Nass, R., "Smart Failure-Prediction Method Now Being Endorsed for SCSI Disk Drives" XPP000531743 (Jul. 1995) 1 page.

* cited by examiner

MULTI-NODE COMPUTER SYSTEM COMPONENT PROACTIVE MONITORING AND PROACTIVE REPAIR

FIELD

An embodiment of the invention is generally directed to electronic data storage systems that have high capacity, performance and data availability, and more particularly to ones that are scalable with respect to adding storage capacity and clients. Other embodiments are also described and claimed.

BACKGROUND

In today's information intensive environment, there are many businesses and other institutions that need to store huge amounts of digital data. These include entities such as large corporations that store internal company information to be shared by thousands of networked employees; online merchants that store information on millions of products; and libraries and educational institutions with extensive literature collections. A more recent need for the use of large-scale data storage systems is in the broadcast television programming market. Such businesses are undergoing a transition, from the older analog techniques for creating, editing and transmitting television programs, to an all-digital approach. Not only is the content (such as a commercial) itself stored in the form of a digital video file, but editing and sequencing of programs and commercials, in preparation for transmission, are also digitally processed using powerful computer systems. Other types of digital content that can be stored in a data storage system include seismic data for earthquake prediction, and satellite imaging data for mapping.

A powerful data storage system referred to as a media server is offered by Omneon Video Networks of Sunnyvale, Calif. (the assignee of this patent application). The media server is composed of a number of software components that are running on a network of server machines. The server machines have mass storage devices such as rotating magnetic disk drives that store the data. The server accepts requests to create, write or read a file, and manages the process of transferring data into one or more disk drives, or delivering requested read data from them. The server keeps track of which file is stored in which drives. Requests to access a file, i.e. create, write, or read, are typically received from what is referred to as a client application program that may be running on a client machine connected to the server network. For example, the application program may be a video editing application running on a workstation of a television studio, that needs a particular video clip (stored as a digital video file in the system).

Video data is voluminous, even with compression in the form of, for example, Motion Picture Experts Group (MPEG) formats. Accordingly, data storage systems for such environments are designed to provide a storage capacity of tens of terabytes or greater. Also, high-speed data communication links are used to connect the server machines of the network, and in some cases to connect with certain client machines as well, to provide a shared total bandwidth of one hundred Gb/second and greater, for accessing the system. The storage system is also able to service accesses by multiple clients simultaneously.

To help reduce the overall cost of the storage system, a distributed architecture is used. Hundreds of smaller, relatively low cost, high volume manufactured disk drives (currently each unit has a capacity of one hundred or more Gbytes) may be networked together, to reach the much larger total storage capacity. However, this distribution of storage capacity also increases the chances of a failure occurring in the system that will prevent a successful access. Such failures can happen in a variety of different places, including not just in the system hardware (e.g., a cable, a connector, a fan, a power supply, or a disk drive unit), but also in software such as a bug in a particular client application program. Storage systems have implemented redundancy in the form of a redundant array of inexpensive disks (RAID), so as to service a given access (e.g., make the requested data available), despite a disk failure that would have otherwise thwarted that access. The systems also allow for rebuilding the content of a failed disk drive, into a replacement drive.

A storage system should also be scalable, to easily expand to handle larger data storage requirements as well as an increasing client load, without having to make complicated hardware ands software replacements.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
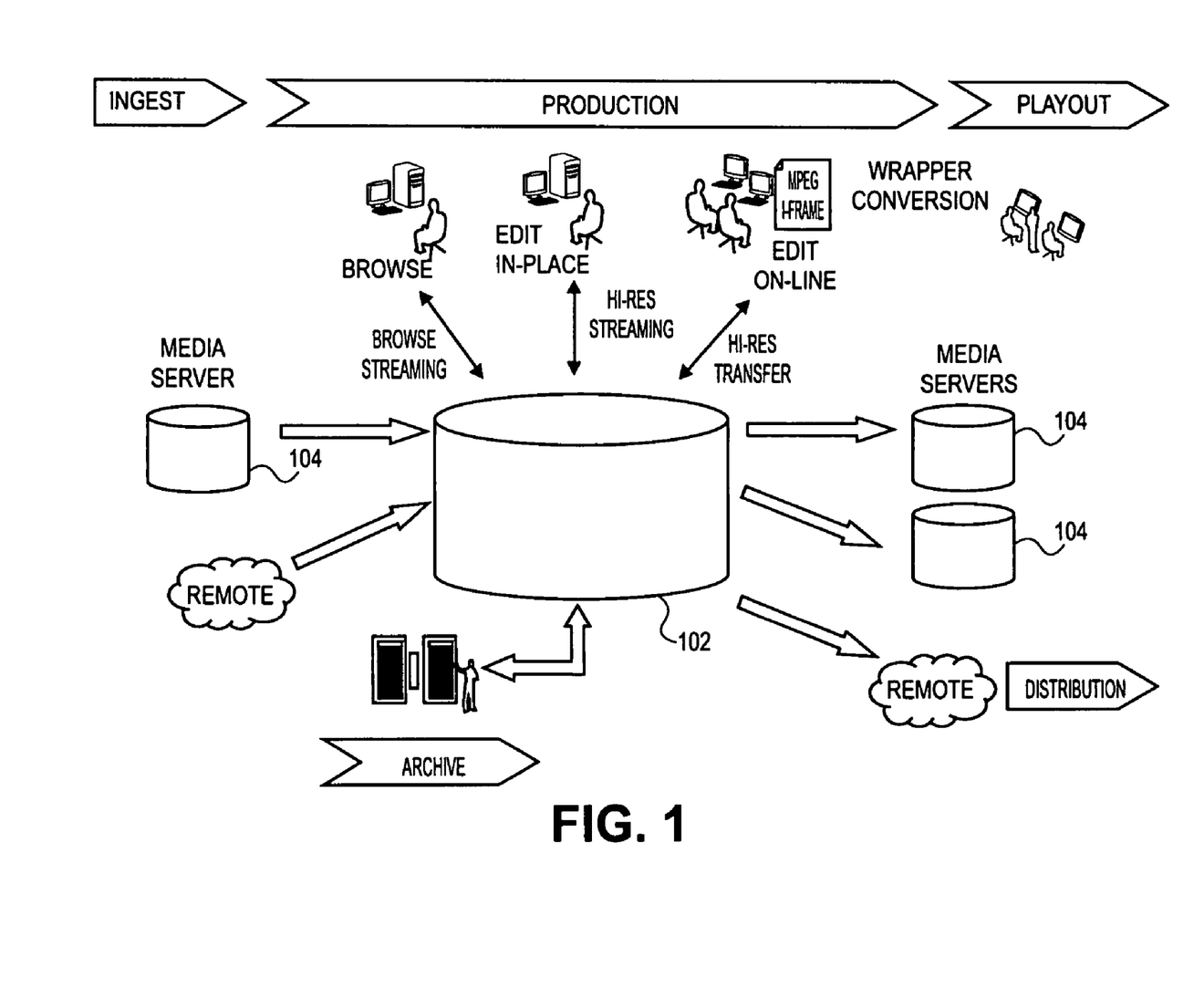
FIG. 1 shows a data storage system, in accordance with an embodiment of the invention, in use as part of a video processing environment.

An embodiment of the invention is a data storage system that may better achieve demanding requirements of capacity, performance and data availability, with a more scalable architecture. FIG. 1 depicts such a storage system as part of a video and audio information processing environment. It should be noted, however, that the data storage system as well as its components or features described below can alternatively be used in other types of applications (e.g., a literature library; seismic data processing center; merchant's product catalog; central corporate information storage; etc.) The storage system 102, also referred to as an Omneon content library (OCL) system, provides data protection, as well as hardware and software fault tolerance and recovery.

The system 102 can be accessed using client machines or a client network that can take a variety of different forms. For example, content files (in this example, various types of digital media files including MPEG and high definition (HD)) can be requested to be stored, by a media server 104. As shown in FIG. 1, the media server 104 can interface with standard digital video cameras, tape recorders, and a satellite feed during an "ingest" phase of the media processing, to create such files. As an alternative, the client machine may be on a remote network, such as the Internet. In the "production phase", stored files can be streamed from the system to client machines for browsing, editing, and archiving. Modified files may then be sent from the system 102 to media servers 104, or directly through a remote network, for distribution, during a "playout" phase.

The OCL system provides a high performance, high availability storage subsystem with an architecture that may prove to be particularly easy to scale as the number of simultaneous client accesses increase or as the total storage capacity requirement increases. The addition of media servers 104 (as in FIG. 1) and a content gateway (to be described below) enables data from different sources to be consolidated into a single high performance/high availability system, thereby reducing the total number of storage units that a business must manage. In addition to being able to handle different types of workloads (including different sizes of files, as well as different client loads), an embodiment of the system 102 may have features including automatic load balancing, a high speed network switching interconnect, data caching, and data replication. According to an embodiment of the invention, the OCL system scales in performance as needed from 20 Gb/second on a relatively small, or less than 66 terabyte system, to over 600 Gb/second for larger systems, that is, over 1 petabyte. Such numbers are, of course, only examples of the current capability of the OCL system, and are not intended to limit the full scope of the invention being claimed.

An embodiment of the invention is an OCL system that is designed for non-stop operation, as well as allowing the expansion of storage, clients and networking bandwidth between its components, without having to shutdown or impact the accesses that are in process. The OCL system preferably has sufficient redundancy such that there is no single point of failure. Data stored in the OCL system has multiple replications, thus allowing for a loss of mass storage units (e.g., disk drive units) or even an entire server, without compromising the data. In contrast to a typical RAID system, a replaced drive unit of the OCL system need not contain the same data as the prior (failed) drive. That is because by the time a drive replacement actually occurs, the pertinent data (file slices stored in the failed drive) had already been saved elsewhere, through a process of file replication that had started at the time of file creation. Files are replicated in the system, across different drives, to protect against hardware failures. This means that the failure of any one drive at a point in time will not preclude a stored file from being reconstituted by the system, because any missing slice of the file can still be found in other drives. The replication also helps improve read performance, by making a file accessible from more servers.

To keep track of what file is stored where (or where the slices of a file are stored), the OCL system has a metadata server program that has knowledge of metadata (information about files) which includes the mapping between the file name of a newly created or previously stored file, and its slices, as well as the identity of those storage elements of the system that actually contain the slices.

In addition to mass storage unit failures, the OCL system may provide protection against failure of any larger, component part or even a complete component (e.g., a metadata server, a content server, and a networking switch). In larger systems, such as those that have three or more groups of servers arranged in respective enclosures or racks as described below, there is enough redundancy such that the OCL system should continue to operate even in the event of the failure of a complete enclosure or rack.

Figure 2:
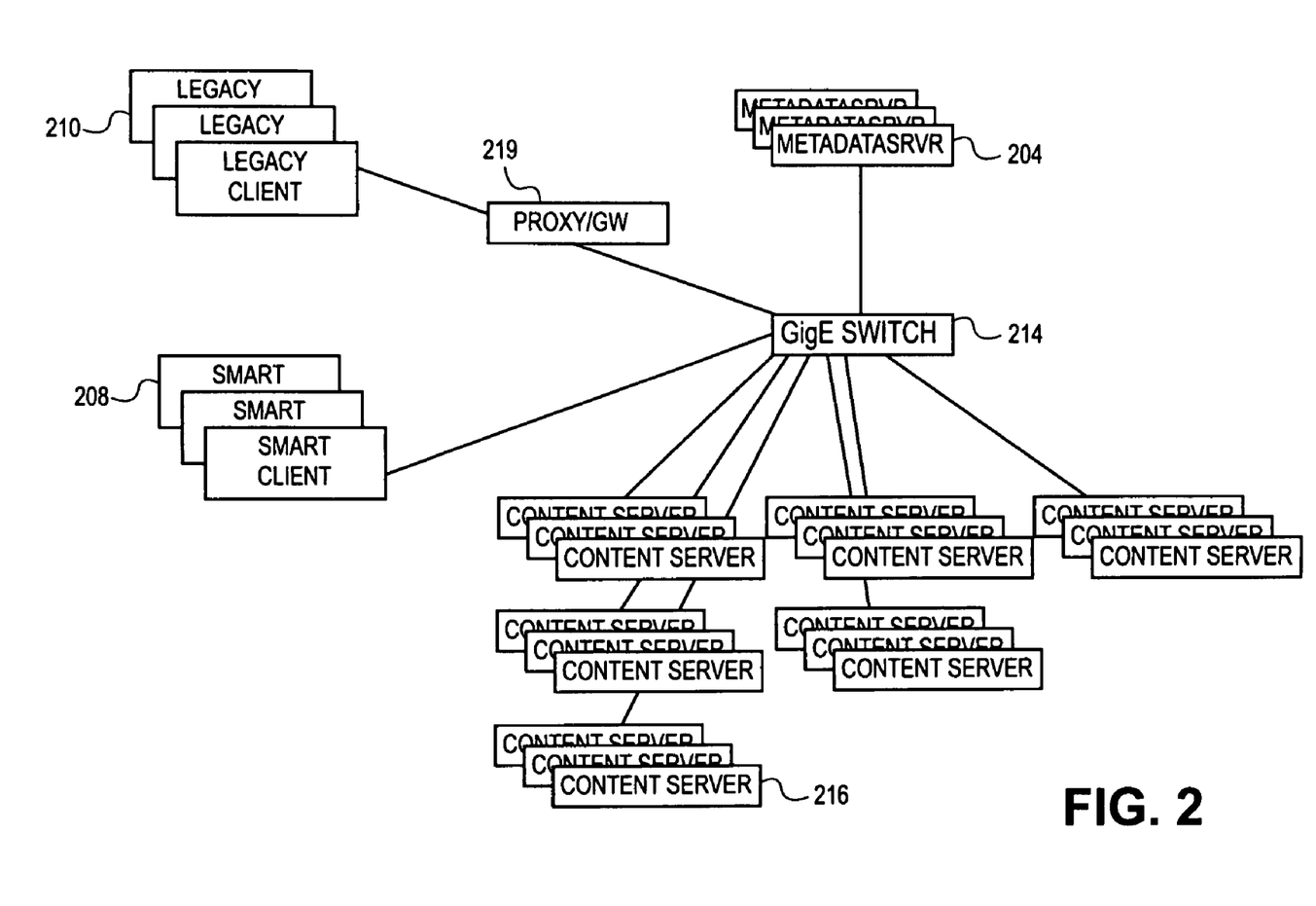
FIG. 2 shows a system architecture for the data storage system, in accordance with an embodiment of the invention.

Referring now to FIG. 2, a system architecture for a data storage system connected to multiple clients is shown, in accordance with an embodiment of the invention. The system has a number of metadata server machines, each to store metadata for a number of files that are stored in the system. Software running in such a machine is referred to as a metadata server 204. A metadata server may be responsible for managing operation of the OCL system and is the primary point of contact for clients. Note that there are two types of clients illustrated, a smart client 208 and a legacy client 210. A smart client has knowledge of a current interface of the system and can connect directly to a system interconnect 214 (here including a Gb Ethernet networking switch) of the system. The system interconnect may act as a selective bridge between a number of content servers 216 and metadata servers 204 as shown. The other type of client is a legacy client that does not have a current file system driver (FSD) installed, or that does not use a software development kit (SDK) that is currently provided for the OCL system. The legacy client indirectly communicates with the system interconnect 214 through a proxy or content gateway 219 as shown, using a typical file system interface that is not specific to the OCL system.

The file system driver or FSD is software that is installed on a client machine, to present a standard file system interface, for accessing the OCL system. On the other hand, the software development kit or SDK allows a software developer to access the OCL directly from an application program. This option also allows OCL-specific functions, such as the replication factor setting described below, to be available to the user of the client machine.

In the OCL system, files are typically divided into slices when stored across multiple content servers. Each content server runs on a different machine having its own set of one or more local disk drivers. This is the preferred embodiment of a storage element for the system. Thus, the parts of a file are spread across different disk drives, in different storage elements. In a current embodiment, the slices are preferably of a fixed size and are much larger than a traditional disk block, thereby permitting better performance for large data files (e.g., currently 8 Mbytes, suitable for large video and audio media files). Also, files are replicated in the system, across different drives, to protect against hardware failures. This means that the failure of any one drive at a point in time will not preclude a stored file from being reconstituted by the system, because any missing slice of the file can still be found in other drives. The replication also helps improve read performance, by making a file accessible from more servers. Each metadata server in the system keeps track of what file is stored where (or where are the slices of a file stored).

The metadata server determines which of the content servers are available to receive the actual content or data for storage. The metadata server also performs load balancing, that is determining which of the content servers should be used to store a new piece of data and which ones should not, due to either a bandwidth limitation or a particular content server filling up. To assist with data availability and data protection, the file system metadata may be replicated multiple times. For example, at least two copies may be stored on each metadata server machine (and, for example, one on each hard disk drive unit). Several checkpoints of the metadata are taken at regular time intervals. A checkpoint is a point in time snapshot of the file system or data fabric that is running in the system, and is used in the event of a system recovery. It is expected that on most embodiments of the OCL system, only a few minutes of time may be needed for a checkpoint to occur, such that there should be minimal impact on overall system operation.

In normal operation, all file accesses initiate or terminate through a metadata server. The metadata server responds, for example, to a file open request, by returning a list of content servers that are available for the read or write operations.

From that point forward, client communication for that file (e.g., read; write) is directed to the content servers, and not the metadata servers. The OCL SDK and FSD, of course, shield the client from the details of these operations. As mentioned above, the metadata servers control the placement of files and slices, providing a balanced utilization of the slice servers.

Although not shown in FIG. 2, a system manager may also be provided, executing for instance on a separate rack mount server machine, that is responsible for the configuration and monitoring of the OCL system.

The connections between the different components of the OCL system, that is the content servers and the metadata servers, should provide the necessary redundancy in the case of a system interconnect failure. See FIG. 3 which also shows a logical and physical network topology for the system interconnect of a relatively small OCL system. The connections are preferably Gb Ethernet across the entire OCL system, taking advantage of wide industry support and technological maturity enjoyed by the Ethernet standard. Such advantages are expected to result in lower hardware costs, wider familiarity in the technical personnel, and faster innovation at the application layers. Communications between different servers of the OCL system preferably uses current, Internet protocol (IP) networking technology. However, other interconnect hardware and software may alternatively be used, so long as they provide the needed speed of transferring packets between the servers.

A networking switch, such as an Ethernet switch or an Infiniband switch, is preferably used as part of the system interconnect. Such a device automatically divides a network into multiple segments, acts as a high-speed, selective bridge between the segments, and supports simultaneous connections of multiple pairs of computers which may not compete with other pairs of computers for network bandwidth. It accomplishes this by maintaining a table of each destination address and its port. When the switch receives a packet, it reads the destination address from the header information in the packet, establishes a temporary connection between the source and destination ports, sends the packet on its way, and may then terminate the connection.

A switch can be viewed as making multiple temporary crossover cable connections between pairs of computers. High-speed electronics in the switch automatically connect the end of one cable (source port) from a sending computer to the end of another cable (destination port) going to the receiving computer, for example on a per packet basis. Multiple connections like this can occur simultaneously.

Figure 3:
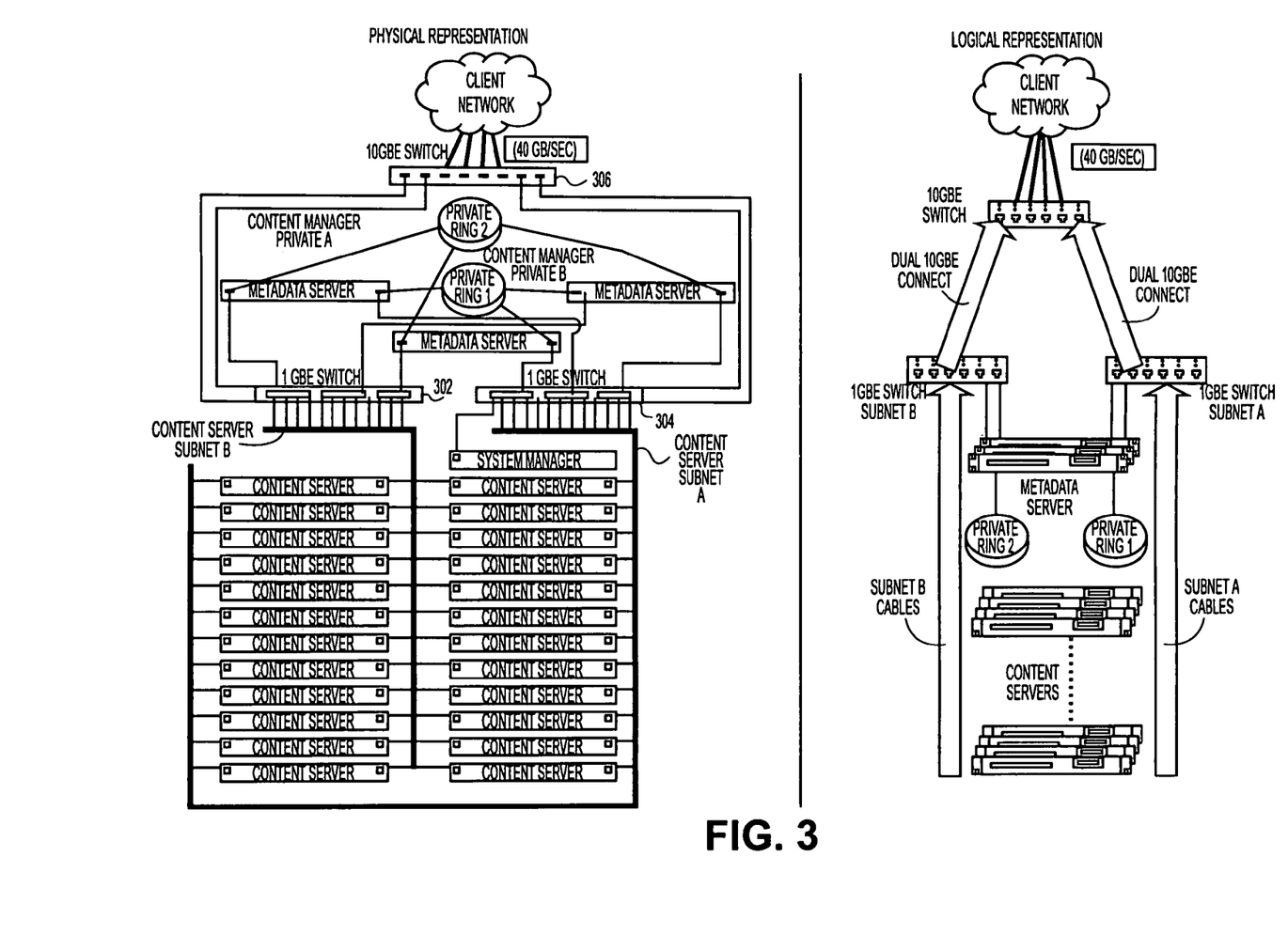
FIG. 3 shows a network topology for an embodiment of the data storage system.

In the example topology of FIG. 3, multi Gb Ethernet switches 302, 304, 306 are used to provide the needed connections between the different components of the system. The current example uses 1 Gb Ethernet and 10 Gb Ethernet switches allowing a bandwidth of 40 Gb/second available to the client. However, these are not intended to limit the scope of the invention as even faster switches may be used in the future. The example topology of FIG. 3 has two subnets, subnet A and subnet B in which the content servers are arranged. Each content server has a pair of network interfaces, one to subnet A and another to subnet B, making each content server accessible over either subnet. Subnet cables connect the content servers to a pair of switches, where each switch has ports that connect to a respective subnet. Each of these 1 Gb Ethernet switches has a dual 10 Gb Ethernet connection to the 10 Gb Ethernet switch which in turn connects to a network of client machines.

In this example, there are three metadata servers each being connected to the 1 Gb Ethernet switches over separate interfaces. In other words, each 1 Gb Ethernet switch has at least one connection to each of the three metadata servers. In addition, the networking arrangement is such that there are two private networks referred to as private ring 1 and private ring 2, where each private network has the three metadata servers as its nodes. The metadata servers are connected to each other with a ring network topology, with the two ring networks providing redundancy. The metadata servers and content servers are preferably connected in a mesh network topology (see U.S. patent application Ser. No. entitled "Network Topology for a Scalable Data Storage System", by Adrian Sfarti, et al.—P020, which is incorporated here by reference, as if it were part of this application. An example physical implementation of the embodiment of FIG. 3 would be to implement each content server in a separate server blade, all inside the same enclosure or rack. The Ethernet switches, as well as the three metadata servers could also be placed in the same rack. The invention is, of course, not limited to a single rack embodiment. Additional racks filled with content servers, metadata servers and switches may be added to scale the OCL system.

Figure 4:
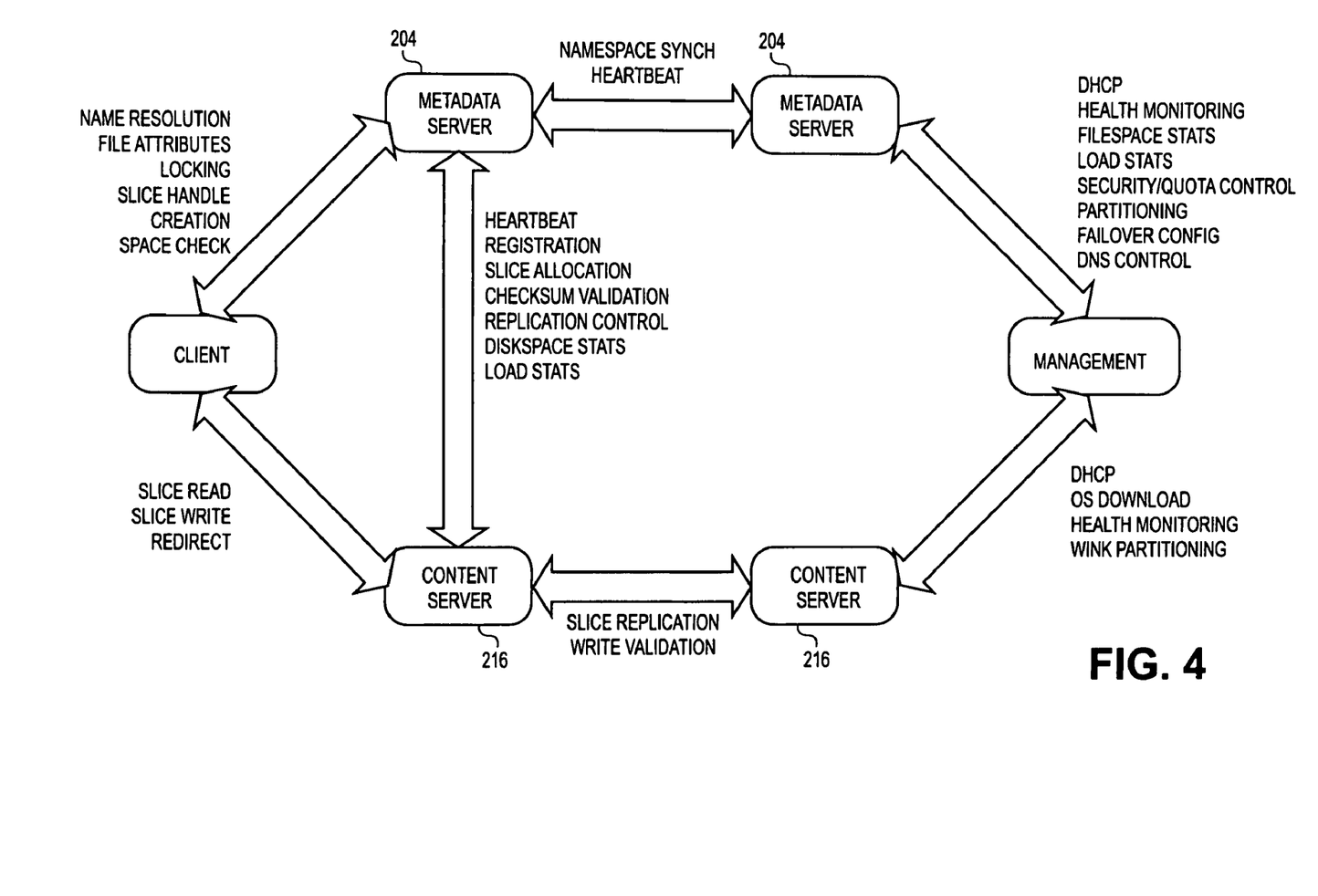
FIG. 4 shows a software architecture for the data storage system, in accordance with an embodiment of the invention.

Turning now to FIG. 4, an example software architecture for the OCL system is depicted. The OCL system has a distributed file system program or data fabric that is to be executed in some or all of the metadata server machines, the content server machines, and the client machines, to hide complexity of the system from a number of client machine users. In other words, users can request the storage and retrieval of, in this case, audio and/or video information though a client program, where the file system or data fabric makes the OCL system appear as a single, simple storage repository to the user. A request to create, write, or read a file is received from a network-connected client, by a metadata server. The file system or data fabric software or, in this case, the metadata server portion of that software, translates the full file name that has been received, into corresponding slice handles, which point to locations in the content servers where the constituent slices of the particular file have been stored or are to be created. The actual content or data to be stored is presented to the content servers by the clients directly. Similarly, a read operation is requested by a client directly from the slice servers.

Each content server machine or storage element may have one or more local mass storage units, e.g. rotating magnetic disk drive units, and its associated content server program manages the mapping of a particular slice onto its one or more drives. The file system or data fabric implements file redundancy by replication. In the preferred embodiment, replication operations are controlled at the slice level. The content servers communicate with one another to achieve slice replication and obtaining validation of slice writes from each other, without involving the client.

In addition, since the file system or data fabric is distributed amongst multiple machines, the file system uses the processing power of each machine (be it a content server, a client, or a metadata server machine) on which it resides. As described below in connection with the embodiment of FIG. 4, adding a server group to increase the storage capacity automatically increases the total number of network interfaces in the system, meaning that the bandwidth available to access the data in the system also automatically increases. In addition, the processing power of the system as a whole also increases, due to the presence of a central processing unit and associated main memory in each content server machine. Adding more clients to the system also raises the processing power of the overall system. Such scaling factors suggest that the system's processing power and bandwidth may grow proportionally, as more storage and more clients are added, ensuring that the system does not bog down as it grows larger.

Still referring to FIG. 4, the metadata servers are considered to be active members of the system, as opposed to being an inactive backup unit. In other words, the metadata servers of the OCL system are active simultaneously and they collaborate in the decision-making. For example, when a content server fails, the content that was stored on the content server is replicated from the remaining content servers in order to maintain the required replication factor for each slice. The replication process is supervised by the metadata servers. The replication process is split equally amongst the metadata servers, and each metadata server is responsible for its piece of the replication process. This allows the system to scale to handling more clients, as the client load is distributed amongst the metadata servers. As the client load increases even further, additional metadata servers can be added.

An example of collaborative processing by multiple metadata servers is the validating of the integrity of slice information stored on a content server. A metadata server is responsible to reconcile any differences between its view and the content server's view of slice storage. These views may differ when a server rejoins the system with fewer disks, or from an earlier usage time. Because many hundreds of thousands of slices can be stored on a single content server, the overhead in reconciling differences in these views can be sizeable. Since content server readiness is not established until any difference in these views is reconciled, there is an instant benefit in minimizing the time to reconcile any differences in the slice views. Multiple metadata servers will partition that part of the data fabric supported by such a content server and concurrently reconcile different partitions in parallel. If during this concurrency a metadata server faults, the remaining metadata servers will recalibrate the partitioning so that all outstanding reconciliation is completed. Any changes in the metadata server slice view is shared dynamically among all active metadata servers.

Another example is jointly processing large scale re-replication when one or multiple content servers can no longer support the data fabric. Large scale re-replication implies additional network and processing overhead. In these cases, the metadata servers dynamically partition the re-replication domain and intelligently repair the corresponding "tears" in the data fabric and corresponding data files so that this overhead is spread among the available metadata servers and corresponding network connections.

Another example is jointly confirming that one or multiple content servers can no longer support the data fabric. In some cases, a content server may become partly inaccessible, but not completely inaccessible. For example, because of the built in network redundancy, a switch component may fail. This may result in some but not all metadata servers to loose monitoring contact with one or multiple content servers. If a content server is accessible to at least one metadata server, the associated data partition subsets need not be re-replicated. Because large scale re-replication can induce significant processing overhead, it is important for the metadata servers to avoid re-replicating unnecessarily. To achieve this, metadata servers exchange their views of active content servers within the network. If one metadata server can no longer monitor a particular content server, it will confer with other metadata servers before deciding to initiate any large scale re-replication.

According to an embodiment of the invention, the amount of replication (also referred to as "replication factor") is associated individually with each file. All of the slices in a file preferably share the same replication factor. This replication factor can be varied dynamically by the user. For example, the OCL system's application programming interface (API) function for opening a file may include an argument that specifies the replication factor. This fine grain control of redundancy and performance versus cost of storage allows the user to make decisions separately for each file, and to change those decisions over time, reflecting the changing value of the data stored in a file. For example, when the OCL system is being used to create a sequence of commercials and live program segments to be broadcast, the very first commercial following a halftime break of a sports match can be a particularly expensive commercial. Accordingly, the user may wish to increase the replication factor for such a commercial file temporarily, until after the commercial has been played out, and then reduce the replication factor back down to a suitable level once the commercial has aired.

Another example of collaboration by the metadata servers occurs when a decrease in the replication factor is specified. In these cases, the global view of the data fabric is used to decide which locations to release according to load balancing and data availability and network paths.

According to another embodiment of the invention, the content servers in the OCL system are arranged in groups. The groups are used to make decisions on the locations of slice replicas. For example, all of the content servers that are physically in the same equipment rack or enclosure may be placed in a single group. The user can thus indicate to the system the physical relationship between content servers, depending on the wiring of the server machines within the enclosures. Slice replicas are then spread out so that no two replicas are in the same group of content servers. This allows the OCL system to be resistant against hardware failures that may encompass an entire rack.

Replication

Replication of slices is preferably handled internally between slice servers. Clients are thus not required to expend extra bandwidth writing the multiple copies of their files. In accordance with an embodiment of the invention, the OCL system provides an acknowledgment scheme where a client can request acknowledgement of a number of replica writes that is less than the actual replication factor for the file being written. For example, the replication factor may be several hundred, such that waiting for an acknowledgment on hundreds of replications would present a significant delay to the client's processing. This allows the client to tradeoff speed of writing versus certainty of knowledge of the protection level of the file data. Clients that are speed sensitive can request acknowledgement after only a small number of replicas have been created. In contrast, clients that are writing sensitive or high value data can request that the acknowledgement be provided by the content servers only after all specified number of replicas have been created.

Intelligent Slices

According to an embodiment of the invention, files are divided into slices when stored in the OCL system. In a preferred case, a slice can be deemed to be an intelligent object, as opposed to a conventional disk block or stripe that is used in a typical RAID or storage area network (SAN) system. The intelligence derives from at least two features. First, each slice may contain information about the file for which it holds data. This makes the slice self-locating. Second, each slice may carry checksum information, making it self-validating. When conventional file systems lose metadata that indicates the locations of file data (due to a hardware or other failure), the file data can only be retrieved through a laborious manual process of trying to piece together file fragments. In accordance with an embodiment of the invention, the OCL system can use the file information that are stored in the slices themselves, to automatically piece together the files. This provides extra protection over and above the replication mechanism in the OCL system. Unlike conventional blocks or stripes, slices cannot be lost due to corruption in the centralized data structures.

In addition to the file content information, a slice also carries checksum information that may be created at the moment of slice creation. This checksum information is said to reside with the slice, and is carried throughout the system with the slice, as the slice is replicated. The checksum information provides validation that the data in the slice has not been corrupted due to random hardware errors that typically exist in all complex electronic systems. The content servers preferably read and perform checksum calculations continuously, on all slices that are stored within them. This is also referred to as actively checking for data corruption. This is a type of background checking activity which provides advance warning before the slice data is requested by a client, thus reducing the likelihood that an error will occur during a file read, and reducing the amount of time during which a replica of the slice may otherwise remain corrupted.

Recovery Prevention Methods

In accordance with another embodiment of the invention, a multi-node computer system such as the OCL data storage system includes software that monitors the aging and usage of hardware components of the system. The hardware components that are to be monitored include fans, power supplies, cables, mass storage units (e.g., rotating magnetic disk drives) and network/packet switches. The monitoring is in conjunction with a proactive component replacement process that is implemented preferably in software that is running in one or more of the metadata server machines. This software, however, can alternatively be distributed as software components executing in different, networked nodes of the system. The software sends a notification to replace a component, in response to determining that the component has aged and/or worn to a predetermined threshold level. This level is selected as being close enough to the component's predicted end of life in the system, so as to prevent failure of the component in the system. In other words, as the components age and/or wear down with continued operation of the system, the proactive replacement strategy steps in to notify a remote process (e.g., one running at a "home" server of the manufacturer of the system) that a certain component is nearing its predicted end of life and should be replaced shortly.

A problem being solved here therefore is that of failure prevention, by monitoring and replacing components before their failure, while operating in the system. Note such a process does not rely on a periodic maintenance schedule which requires that certain components be replaced periodically, according to fixed intervals, regardless of their actual use in the system. An embodiment of the invention monitors the aging and usage of hardware components as they are operating in the system, and on that basis calculates when a particular component should be replaced to avoid its failure in the field. This type of proactive component replacement process essentially makes recovery from a failure, for the most part, unnecessary, due to continuously monitoring the health of the components of the system and determining when a component is approaching its predicted failure time.

In a preferred embodiment of the invention, the data storage system is fully redundant (as in the OCL system) in that there is no single point of failure in the system. A part of the system can thus be shutdown for replacement, while the system continues to run, that is without impacting any stored data. The component replacement may be scheduled automatically entirely under computer control, via the replacement process described here.

Figure 5:
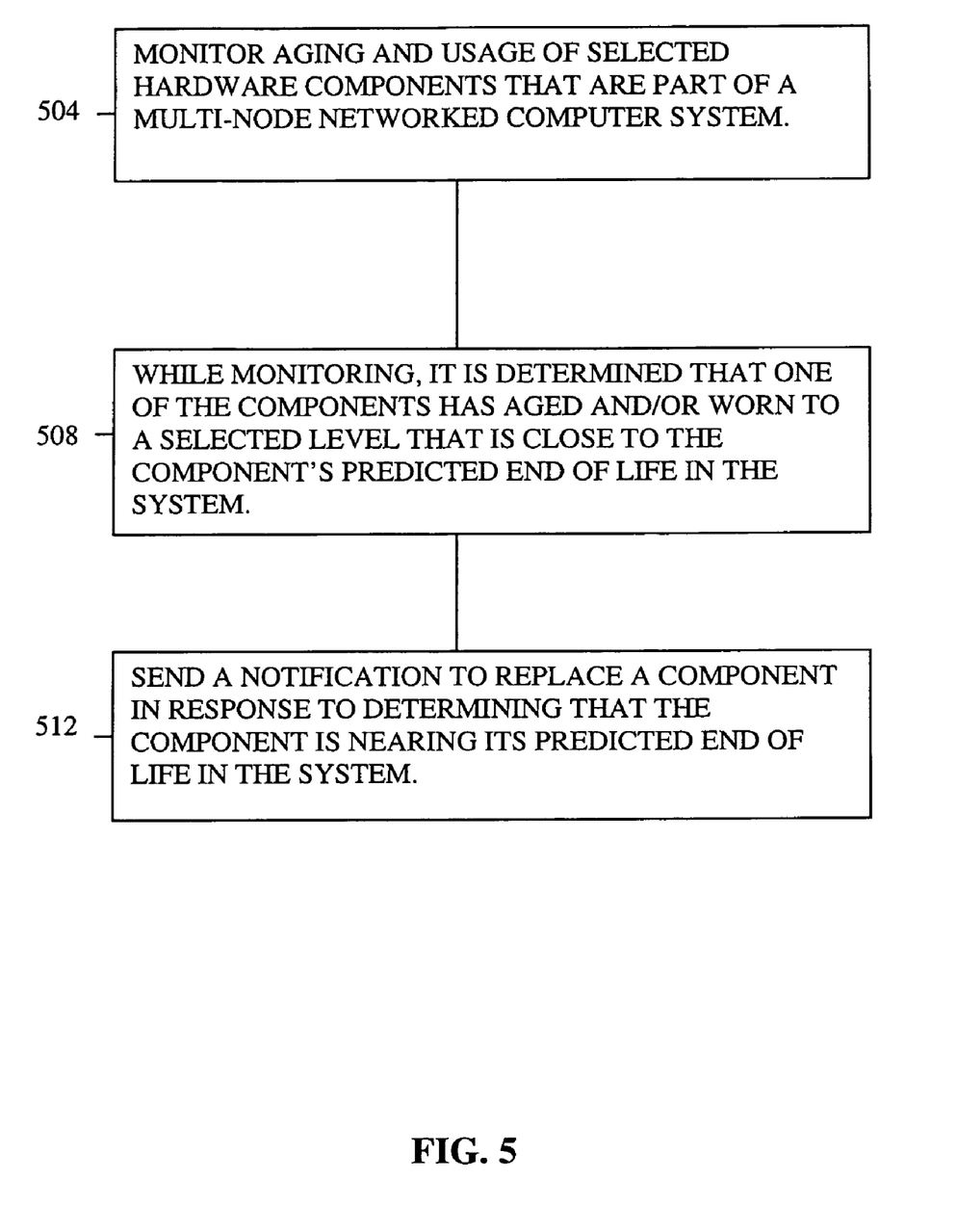
FIG. 5 is a flow diagram of a computer-implemented method for operating a high availability multi-node computer system.

Turning now to FIG. 5, a flow diagram of a computer-implemented method for operating a proactive replacement process in a high availability multi-node computer system, such as the OCL system described above, is shown. Beginning with operation 504, aging and usage of a number of selected hardware components that are part of a multi-node computer system are monitored. Examples include tracking how many hours a mass storage unit that is part of the system has been operating in the system, at different levels, such as idle and standby. The monitoring may also include tracking the total number of internal movement operations involved in read and write operations to the mass storage unit. For a rotating magnetic disk drive, the internal movement operations could be head and/or arm movements during read, write, or seek operations.

Staying with the mass storage unit, the monitoring may further include tracking the total number of power up to power down cycles to which each mass storage unit is subjected. I/O errors in the mass storage unit, including if possible error correction code instances, may also be tracked. The monitoring may also include obtaining the build date and burn in time of the mass storage unit from both the manufacturer of the mass storage unit and the manufacturer of the multi-node computer system in which it will be used.

The monitoring of the computer system may also address other components, such as tracking the operation of one or more fans in the system. The operating temperature in the system may also be tracked at critical or sensitive locations of the system. For cables and physical layer interface circuitry (PHYs) in the system, the number and/or rate of dropped, corrupted, or corrected network packets may be monitored. Other aspects of the system may also be monitored.

Returning to FIG. 5, while monitoring the components (operation 504), a determination is made that one of the components has aged and/or worn, to a level that has been selected as being close enough to that component's predicted end of life in the system, so as to prevent failure of the component in the system (operation 508). The following process may be used that leads to such a determination: First, degradation of a component in the system is analyzed by calculating a reliability or degradation factor for that component, based on the monitoring data; next, the component's age or wear level in the system is calculated based on the reliability factor, to predict when the component should be replaced before it fails. Such a process may be performed by software running continuously in the system, monitoring and making determinations for a number of selected components of the system.

When the calculated age or wear level reaches a selected threshold level that is deemed close enough to the component's predicted end of life in the system, a notification is sent to replace the component in response to such a determination (operation 512). As an example, the analysis of the degradation of the component may include calculating reliability factors for network connection cables and PHYs in the system, based on analyzed trends in dropped, corrupted, or corrected network packets. Software, running preferably in the system, analyzes the trends in such problem packets over a relatively long period of time while the system is in use, to determine the predicted end of life of the relevant cables or PHYs that may be causing the problem packets. Thus, another embodiment of the invention lies in a computer-implemented method for operating a multi-node computer system, by monitoring the aging and usage of hardware components that make up the system, analyzing degradation of the components, including calculating a degradation factor for each component based on the monitoring, and calculating each component's age or wear level in the system based on the degradation factor. This calculated age or wear level is designed to predict when the component should be replaced before it fails in the system. A notification is automatically sent to replace a component in response to determining that the component's calculated age or wear level has reached a threshold indicating that it should be replaced to avoid its imminent failure in the system.

Another embodiment of the invention lies in a computer implemented method for operating a multi-node data storage system at a distributor, manufacturer, or service representative for the system. In that embodiment, a notification is received from the multi-node data storage system that identifies an operating component of the system as being ready to be replaced (based on monitoring of the system by a proactive replacement process running in the system). A service visit is automatically scheduled to replace the identified component from the system, in the field.

An embodiment of the invention may be a machine readable medium having stored thereon instructions which program one or more processors to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

The invention is not limited to the specific embodiments described above. For example, although the OCL system was described with a current version that uses only rotating magnetic disk drives as the mass storage units, alternatives to magnetic disk drives are possible, so long as they can meet the needed speed, storage capacity, and cost requirements of the system. Accordingly, other embodiments are within the scope of the claims.

What is claimed is:

1. A data storage system comprising:
a plurality of metadata server machines each configured to store metadata for a plurality of files that are stored in the system;
a plurality of slice server machines configured to store slices of said files at locations, in the slice server machines, indicated by the metadata;
a packet switching interconnect configured to communicatively couple the metadata and slice servers;
a distributed file system configured to execute in the metadata and slice server machines, the file system to hide complexity of the data storage system from clients; and
a storage device storing sequences of instructions which when executed by a processor cause monitoring a wear level of a hardware component of the data storage system and sending a notification in response to determining that the wear level has reached a predetermined level;
wherein the wear level is based, at least in part, on an amount of usage of the hardware component and wherein the wear level is independent of detected failure of the hardware component;
wherein the predetermined level is based at least in part on a predicted end of life for the hardware component;
wherein the wear level corresponds to a number of power up to power down cycles of the hardware component.

2. The system of claim 1 wherein the metadata server machines, slice server machines, packet switching interconnect, and distributed file system are configured to implement redundancy and are configured to permit removing and replacing any packet switch that is part of the packet switching interconnect while the system is running without experiencing any loss of stored data.

3. The system of claim 1 wherein the storage device further stores instructions which when executed cause sending the notification to an entity that will schedule a service visit to replace the hardware component.

4. The system of claim 1 wherein the storage device is in the metadata server machines.

5. The system of claim 1, wherein the wear level corresponds to an amount of time the hardware component has operated at a certain level.

6. The system of claim 1, wherein the wear level corresponds to a number of internal movement operations of the hardware component.

7. The system of claim 1, wherein the hardware component is a mass storage unit.

8. The system of claim 1, wherein the hardware component is a fan.

9. The system of claim 1, wherein the hardware component is a packet switch.

10. The system of claim 1, wherein the hardware component is a power supply.

11. The system of claim 1, wherein the hardware component is a cable.

12. A computer-implemented method comprising:
monitoring a wear level of a hardware component of a data storage system; and
sending a notification in response to the wear level reaching a predetermined level;
wherein the wear level is based, at least in part, on an amount of usage of the hardware component and wherein the wear level is independent of detected failure of the hardware component;
wherein the predetermined level is based at least in part on a predicted end of life for the hardware component;
wherein the wear level corresponds to a number of power up to power down cycles of the hardware component.

13. The method of claim 12 wherein the notification is sent to an entity that will schedule a service visit to replace the hardware component.

14. The method of claim 12, wherein the wear level corresponds to an amount of time the hardware component has operated at a certain level.

15. The method of claim 12, wherein the wear level corresponds to a number of internal movement operations of the hardware component.

16. The method of claim 12, wherein the hardware component is a mass storage unit.

17. The method of claim 12, wherein the hardware component is a fan.

18. The method of claim 12, wherein the hardware component is a packet switch.

19. The method of claim 12, wherein the hardware component is a power supply.

20. The method of claim 12, wherein the hardware component is a cable.

* * * * *